US007698938B2

(12) United States Patent
Inagaki et al.

(10) Patent No.: US 7,698,938 B2
(45) Date of Patent: Apr. 20, 2010

(54) FLOWMETER HAVING A BENT INLET PASSAGE FOR CONSTANT FLOW-VELOCITY DISTRIBUTION

(75) Inventors: Hiroyuki Inagaki, Tokyo (JP); Isamu Warashina, Tokyo (JP)

(73) Assignee: Yamatake Corporation, Tokyo (JP)

(*) Notice: Subject to any disclaimer, the term of this patent is extended or adjusted under 35 U.S.C. 154(b) by 254 days.

(21) Appl. No.: 11/570,249

(22) PCT Filed: Jun. 10, 2005

(86) PCT No.: PCT/JP2005/010708

§ 371 (c)(1), (2), (4) Date: Oct. 10, 2007

(87) PCT Pub. No.: WO2005/121718

PCT Pub. Date: Dec. 22, 2005

(65) Prior Publication Data

US 2008/0034886 A1 Feb. 14, 2008

(30) Foreign Application Priority Data

Jun. 10, 2004 (JP) ............................ 2004-172781

(51) Int. Cl.
*G01F 1/68* (2006.01)

(52) U.S. Cl. ............... 73/204.22; 73/204.26; 73/204.21

(58) Field of Classification Search ....................... None
See application file for complete search history.

(56) References Cited

U.S. PATENT DOCUMENTS 5,279,154 A * 1/1994 Vavra et al. ................ 73/202.5
5,279,155 A 1/1994 Johnson et al.
6,286,373 B1 * 9/2001 Lister et al. ............ 73/861.355
6,526,822 B1 * 3/2003 Maeda et al. ............ 73/204.21
6,571,621 B2 * 6/2003 Watanabe et al. .......... 73/202.5
6,578,414 B2 * 6/2003 Kohmura et al. .............. 73/202
6,647,776 B2 * 11/2003 Kohmura et al. ......... 73/204.21
6,776,052 B2 * 8/2004 Crisfield et al. ........ 73/861.354
6,802,224 B2 * 10/2004 Nakao et al. ........... 73/861.354
7,059,183 B2 * 6/2006 Kikawa et al. ............. 73/202.5
7,201,047 B2 * 4/2007 Kikawa et al. ............. 73/202.5
7,228,733 B2 * 6/2007 Seki et al. .................. 73/202.5
2002/0078744 A1 6/2002 Gehman et al.

FOREIGN PATENT DOCUMENTS

EP 1091195 A1 4/2001
EP 1179726 A2 2/2002
EP 1256786 A2 11/2002
JP 05-322624 12/1993
JP 08-094409 4/1996
JP 2589318 Y2 1/1999
JP 3091893 B2 9/2000
JP 2001-004420 A 1/2001
JP 3188597 B2 7/2001
JP 2004-003887 A 1/2004

* cited by examiner

*Primary Examiner*—Harshad Patel
(74) *Attorney, Agent, or Firm*—Rothwell, Figg, Ernst & Manbeck PC

(57) ABSTRACT

To provide a flowmeter producing stable measurement results and coincidentally achieving miniaturization, a bent portion is provided in a flow path located between an inlet port of fluids to the flowmeter and a second flow path at which a sensor detecting a flow rate is positioned, thus forming at a sensor an almost uniform flow-velocity distribution in cross-section of the fluids and a reproducible and constant flow-velocity distribution.

2 Claims, 5 Drawing Sheets

(a)

(b)

(c)

FLOWMETER HAVING A BENT INLET PASSAGE FOR CONSTANT FLOW-VELOCITY DISTRIBUTION

CROSS REFERENCE TO RELATED APPLICATION(S)

This application is a 35 U.S.C. §371 National Phase Entry Application from PCT/JP2005/010708, filed Jun. 10, 2005, and designating the United States.

TECHNICAL FIELD

The present invention relates to a flowmeter used for purposes including absorption verification of micro components in a chip mounter, for example.

BACKGROUND ART

Conventionally, there has been appeared an apparatus to detect flow rate variations of the absorption nozzle for verifying how micro chips etc are absorbed, and a flowmeter is used for the purpose of detecting such flow rate variations. Flowmeters of this kind include, as shown in Patent document 1 (JP-A-2004-3887), for example, a flowmeter in which inlet port and outlet port are provided at both ends of the flow paths thereof, a flow path is provided perpendicular to the flow paths of the inlet port and the outlet port, respectively, and a flow path in the flowmeter is constituted such that these flow paths and a flow path in which a flow sensor is positioned placed at right angles to each other, thereby forming a repeatable flow-velocity distribution of fluids to be measured while miniaturizing the flowmeter and producing measurement results.

The above-mentioned traditional flowmeter is of a shape of the flow paths as aforesaid, which realizes a small flowmeter and produces constant measurement results. However, strong demands are made to the apparatus equipped with such a flowmeter for further lightening and miniaturization thereof, from the viewpoint of a limited mounting space and increase in weight. Therefore, there has been increased demands for the miniaturized and lightened flowmeters.

The present invention has been made to solve the above-mentioned problems. An object of the present invention is to provide a flowmeter producing constant measurement results, and coincidentally achieving miniaturization and lightening thereof.

DISCLOSURE OF THE INVENTION

The flowmeter according to the present invention is arranged such that a bent portion is provided in a flow path situated between a flow path inlet of fluids of the flowmeter and a sensor flow path in which a sensor detecting a flow rate of the fluids is situated, and the fluids collide against walls constituting the bent portion to form a repeatable and constant flow-velocity distribution.

The flowmeter according to the present invention is arranged such that a bent portion is provided in a flow path located between a manifold for an intake of fluids and a sensor flow path at which a sensor detecting a flow rate of the fluids is positioned, and the fluids collide against walls constituting the bent portion to form a repeatable and Constant flow-velocity distribution.

The flowmeter according to the present invention is arranged such that a sensor flow path at which a sensor detecting a flow rate of fluids is situated and an upstream flow path positioned upstream of the sensor flow path is bent, an open end of the upstream flow path is abutted against an inlet port of a manifold for feeding the fluids thereto, and the upstream flow path has a bent portion between the abutted surface of the inlet port and the sensor flow path.

Further, the flowmeter according to the present invention is arranged such that the bent portion is formed to include the abutted surface with the inlet port.

Still further, the flowmeter according to the present invention is arranged such that the bent portion comprises a first flow path formed substantially perpendicular to a flow direction of an inlet port; a second flow path connected to the first flow path substantially perpendicular thereto; a third flow path connected to the second flow path substantially perpendicular thereto; and a fourth flow path connected to the third flow path substantially perpendicular thereto.

Yet further, the flowmeter according to the present invention is arranged such that a sectional area of the sensor flow path at which the sensor is positioned is reduced.

Yet further, the flowmeter according to the present invention is arranged such that the flowmeter includes a flowmeter body and a circuit board holding a sensor provided on the top surface of a flowmeter body, the flowmeter body includes first and second holes formed toward downward in the vertical direction from the top surface of the flowmeter body and third and fourth holes formed toward upward in the vertical direction from the bottom surface of the flowmeter body, and a bent portion is provided by forming the first-fourth holes substantially parallel to each other; setting the minimum distance between ends of the first and the second holes and the maximum distance between ends of the third and the fourth holes to about the same distance; and bringing the interior of the first hole into communicate with the exterior of the third hole and the interior of the second hole communicate with the exterior of the fourth hole.

Yet further, the flowmeter according to the present invention is arranged such that a curved surface portion is provided on a flow path wall of intersections of the first hole and the second hole and the straight sensor flow path.

The flowmeter of the present invention is arranged such that a bent portion is provided in a flow path located between a manifold and a sensor flow path, and fluids collide against walls of the bent portion to form a repeatable and constant flow-velocity distribution, thus producing constant measurement results of the flow rate. This is because the flow having the flow-velocity distribution produced within the flow path of the manifold changes by bumping against the walls of the bent portion, to thereby reorganize the flow-velocity distribution in the flow path, and the flow repeats this process to change the flow-velocity distribution produced in the flow path located in the front portion of an inlet of the flowmeter such as the manifold, thus forming a flow-velocity distribution by the bent portion.

The flowmeter of the present invention is arranged such that an open end of an upstream flow path located upstream of a sensor flow path is abutted against an inlet port of a manifold, and an upstream flow path has a bent portion between the abutted surface of the inlet port and the sensor flow path, thus achieving miniaturization and lightening of the flowmeter, and at the same time producing constant flow rate measurement results.

Further, the flowmeter of the present invention is arranged such that a bent portion is formed to include an abutted surface with an inlet port, thus shortening the length of a flow path, and further achieving miniaturization and lightening of the flowmeter as the flowmeter eliminates the necessity of a connecting portion for connecting with an external flow path.

Still further, the flowmeter of the present invention is arranged such that a bent portion is formed to include first-fourth flow paths of which flow directions are substantially bent at right angles from the inlet port, which forms a reproducible and constant flow-velocity distribution, thus resulting in producing more constant flow rate measurement results.

Still further, the flowmeter of the present invention is arranged such that a sectional area of a sensor flow path at which the sensor is positioned is reduced, thus further straightening fluids guided to the sensor flow path in a flow path of which sectional area is reduced, and measuring a flow rate by the sensor under more stable conditions.

Yet further, the flowmeter of the present invention includes a flowmeter body and a circuit board holding a sensor provided on the top surface of the flowmeter body, and the flowmeter is arranged such that the flowmeter body includes first and the second holes formed toward downward in the vertical direction from the top surface of the flowmeter body and third and the fourth holes formed toward upward in the vertical direction from the bottom surface of the flowmeter body, and a bent portion is provided by forming first-fourth holes substantially parallel to each other; setting the minimum distance between ends of the first and the second holes and the maximum distance between ends of the third and the fourth holes to about the same size; and bringing the interior of the first hole into communicate with the exterior of the third hole and the interior of the second hole into communicate with the exterior of the fourth hole, thus enabling communication to be provided between the first hole and the third hole, and between the second hole and the fourth hole by injection molding the flowmeter body with two metal molds, and enabling the flowmeter having the bent portion to be easily made.

Yet further, the flowmeter of the present invention is arranged such that a curved surface portion is provided on a flow path wall of intersections of a first hole and a second hole and a straight sensor flow path, and of the second hole and the straight sensor flow path, thus shortening the length of the straight portion of the sensor flow path as fluids smoothly flow from the first hole to the sensor flow path.

BEST MODE FOR CARRYING OUT THE INVENTION

First Embodiment

Figure 1:
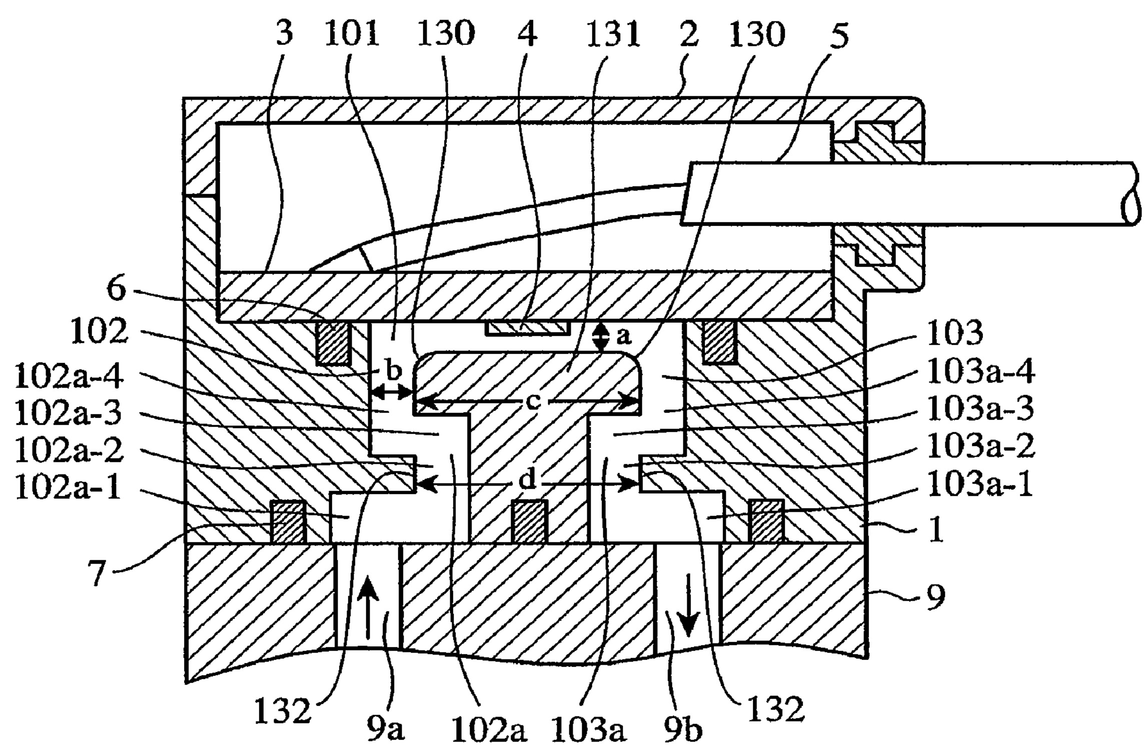
FIG. 1 is a sectional view of a flowmeter according to the First Embodiment of the present invention.

FIG. 1 is a sectional view of a flowmeter according to the First Embodiment of the present invention.

Figure 2:
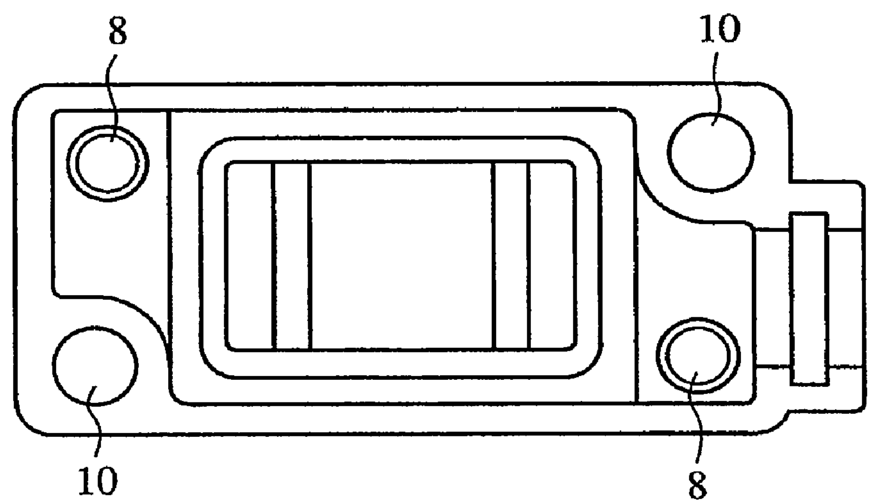
FIG. 2 is a top plan view of a flowmeter body according to the First Embodiment of the present invention.

FIG. 2 is a view of a flowmeter body according to the First Embodiment of the present invention, in the state in which a cover 2, a circuit board 3, and a packing 6 are removed therefrom, seen from the top surface of the flowmeter body.

Figure 3:
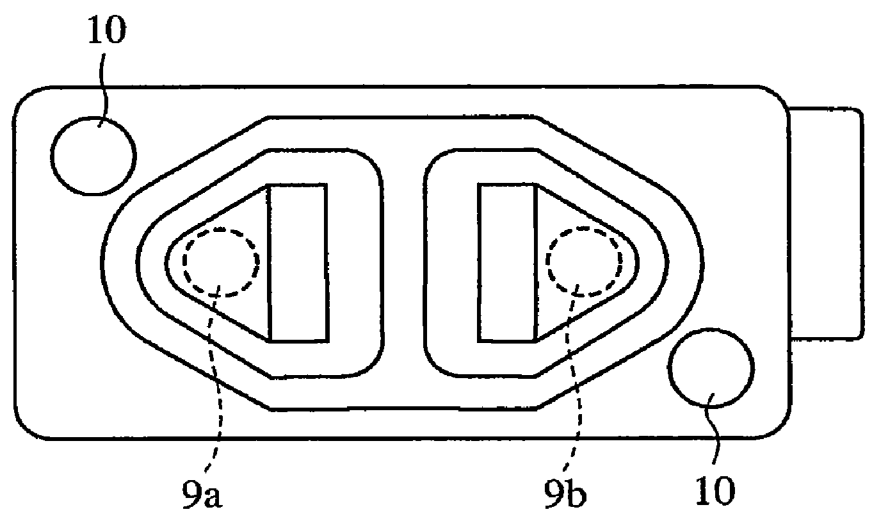
FIG. 3 is a bottom plan view of a flowmeter body according to the First Embodiment of the present invention.

FIG. 3 is a view of the flowmeter body according to the First Embodiment of the present invention, in the state in which a packing 7 is removed therefrom, seen from the bottom surface of the flowmeter body.

Figure 4:
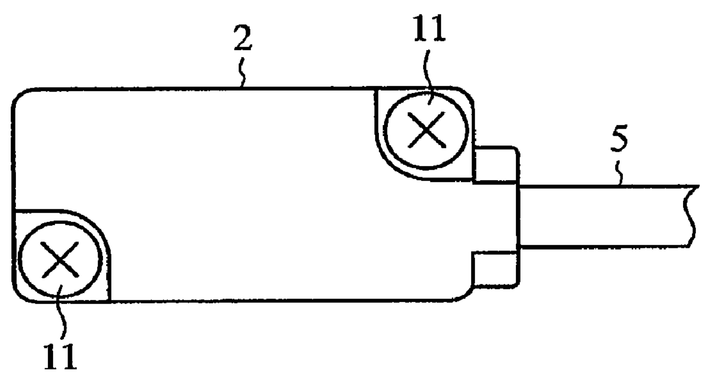
FIG. 4 is an external view of a flowmeter according to the First Embodiment of the present invention.
Figure 4:
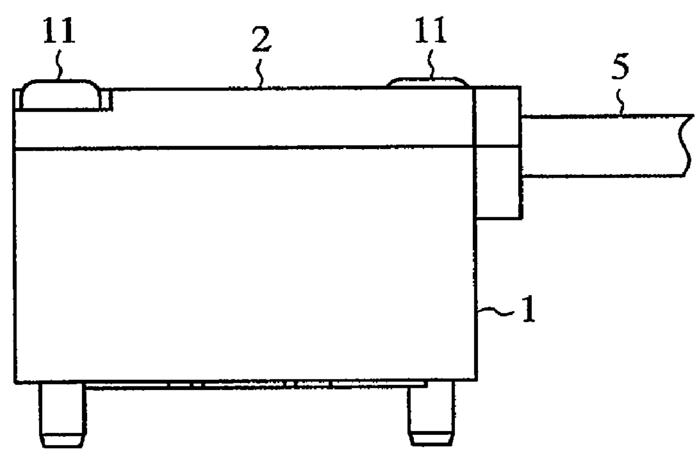
Figure 4:
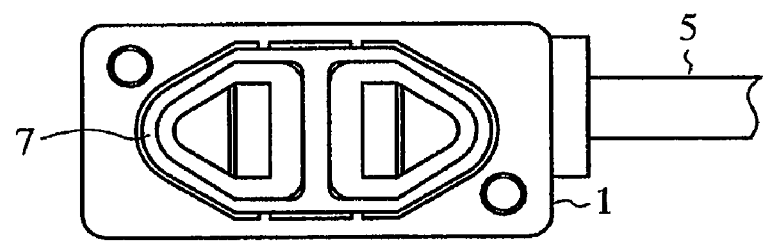

FIG. 4 is an external view of the flowmeter according to the First Embodiment of the present invention, 4(*a*) is a top plan view, 4(*b*) is a side view, and 4(*c*) is a bottom plan view thereof.

Referring to these figures, the flowmeter includes the flowmeter body 1, the cover 2, the circuit board 3, a sensor 4, a lead wire 5, and the packings 6, 7. The flowmeter body 1 and the cover 2 are formed of resin such as PBT (polybutylene terephtalate) resin, for example, and these flowmeter body 1 and cover 2 are integrally secured to each other by ultrasonic welding or the like. The circuit board 3 is provided with a circuit for detecting a flow rate by the sensor 4, and the sensor 4 is attached to the bottom side thereof, with the board being mounted thereon such that the board constitutes part of walls of a sensor flow path to be described later. The circuit board 3 is arranged to be fastened integrally with the flowmeter body 1 by screws (not shown) into screw holes 8 (see FIG. 2) formed in the flowmeter body 1.

The sensor 4 is a flow sensor, for example, in which temperature-measuring resistor elements are disposed so as to sandwich a heater element therebetween, and the sensor is provided so as to slightly project into the sensor flow path. The lead wire 5 is for taking out flow rate data detected by the sensor 4. The packing 6 is for preventing a leakage of fluids between the circuit board 3 and the flowmeter body 1, and the packing 7 is for preventing a leakage of fluids between the flowmeter body 1 and a manifold 9.

A flow path is formed in the flowmeter body 1 for detecting a flow rate by the sensor 4, and the flow path consists of a sensor flow path 101 at which the sensor 4 is positioned, an upstream flow path 102 situated upstream of the sensor flow path 101, and a downstream flow path 103 located downstream thereof.

The sensor flow path 101 is rectangular in cross section, straight in shape, which is partitioned by the flowmeter body 1 and the circuit board 3, and the sensor flow path is arranged such that the sensor 4 is positioned exactly on the center between a flow direction along the flow path 101 and a direction perpendicular to the flow direction. Moreover, the upstream flow path 102 and the downstream flow path 103 are arranged such that the flow paths thereof are bent substantially perpendicular to the sensor flow path 101, and further, the upstream flow path 102 and the downstream flow path 103 include bent portions 102*a*, 103*a* between these flow paths and the manifold 9. Furthermore, the upstream flow path 102 and downstream flow path 103 are disposed symmetrically with the position of the sensor 4 as the center.

The bent portions 102*a*, 103*a* are located on an abutted surfaces with an inlet port 9*a* and an outlet port 9*b* of the manifold 9, and formed to include first flow paths 102*a*-1, 103*a*-1 formed substantially perpendicular to a flow direction of fluids in the inlet port 9*a* and the outlet port 9*b*; second flow paths 102*a*-2, 103*a*-2 formed substantially perpendicular to a flow direction of the first flow paths 102*a*-1, 103*a*-1; third flow paths 102*a*-3, 103*a*-3 formed substantially perpendicular to a flow direction of the second flow paths 102*a*-2, 103*a*-2; and fourth flow paths 102*a*-4, 103*a*-4 formed perpendicular to a flow direction of the third flow paths 102*a*-3, 103*a*-3.

In other words, the bent portion in U-shaped cross section is formed by the first flow paths 102*a*-1, 103*a*-1 to the third flow paths 102*a*-3, 103*a*-3.

Furthermore, it is arranged such that the flow directions of the fourth flow paths 102*a*-4, 103*a*-4 and the flow directions of the inlet port 9*a* and the outlet port 9*b* are parallel to each other, and that the position of their respective central axes are different from each other. However, no limitations are put on the positional relation, and any positional relation may be had.

Moreover, shapes of open ends of the bent portions 102*a*, 103*a* (shapes of a joining portion thereof with which the manifold 9 is joined) are arranged such that, as shown in FIG. 3 and FIG. 4(*c*), each of the inlet port 9*a* side and the outlet port 9*b* side of the manifold 9 is substantially triangular in shape. Say in addition, in FIG. 3, the dashed lines indicate the positions of the inlet port 9*a* and the outlet port 9*b*, respectively.

Also, it is arranged such that two screw holes 10 are formed on the flowmeter body 1 and the cover 2, and they are secured to the manifold 9 by screws 11 (see FIG. 2 to FIG. 4). Herein, the inlet port 9*a* side and the outlet port 9*b* side of the open ends of the bent portions 102*a*, 103*a* are substantially triangular in shape. For this reason, these screw holes 10 are formed off a straight line connecting the inlet port 9*a* and the outlet port 9*b*, thereby narrowing the distance therebetween, which therefore contributes to miniaturization of the flowmeter in this respect.

Moreover, it is arranged such that a height dimension a perpendicular to the flow direction of the sensor flow path 101 is smaller than a gap b of the upstream flow path 102 and the downstream flow path 103. This is because, as described in the patent document 1, the height dimension perpendicular to a flow of fluids in the flow path at which the sensor 4 is positioned is set to the height dimension within which straitening is accomplished by the viscosity of the fluid, thereby enabling the flow of the fluids in the vicinity of the sensor 4 to be straitened, and further, turning the flow thereof into a laminar flow. Such shapes ensure constant measurement results by the sensor 4.

When the flowmeter thus arranged as above is applied to a chip mounter, for example, the inlet port 9*a* side of the manifold 9 is connected to an absorption nozzle (not shown), and the outlet port 9*b* side thereof is connected to a vacuum pump (not shown). When the vacuum pump is activated under such a condition, air that is a fluid, is sucked through the inlet port 9*a* to the upstream flow path 102, as shown by the arrow in FIG. 1, and finally is sucked to the vacuum pump through the sensor flow path 101 and the downstream flow path 103.

At that time, a flow rate of the air flowing through the sensor flow path 101 is detected by the sensor 4, and the detected value is sent to a controller (not shown) through the lead wire 5, a value of the flow velocity, that is, a flow rate being calculated therein. For a chip mounter or the like, a flow rate becomes the maximum in the state where nothing has been absorbed by the absorption nozzle, and a flow rate becomes approximately zero conversely in the state where chips have been absorbed by the absorption nozzle, thus determining whether or not the absorption nozzle is absorbing the chips.

Herein, in the upstream flow path 102 of the First Embodiment, the flow path extending from the inlet port 9*a* in the upstream flow path 102 is orthogonally bent approximately four times. That is, air, that is flowed thereinto through the inlet port 9*a*, bumps against the walls of the bent portion 102*a* four times and changes its flow direction. It has been experimentally verified that a flow direction of air (air bumps against the walls several times) is formed by changing a repeatable and constant flow-velocity distribution several times. This conjectured for the following reasons.

A flow, having the flow-velocity distribution produced within the flow path of the manifold 9, bumps against the walls of the bent portions 102*a*, 103*a*, changes thereby, and reorganizes the flow-velocity distribution within the flow path. And, this process is repeated in the first flow paths 102*a*-1, 103*a*-1 to the fourth flow paths 102*a*-4, 103*a*-4, respectively. This changes the flow-velocity distribution produced within the manifold 9, and forms a new flow-velocity distribution by the bent portions 102*a*, 103*a*.

As a result, the repeatable and constant flow-velocity distribution of the fluids flowing into the sensor flow path 101 is formed, thus producing constant flow rate measurement results.

As mentioned above, according to the First Embodiment, it is arranged such that the open end of the upstream flow path 102 situated upstream of the sensor flow path 101 is abutted with the inlet port 9*a* of the manifold 9, and that the upstream flow path 102 has the bent portion 102*a* consisting of the first flow path 102*a*-1 including the abutted surface of the inlet port 9*a* to the fourth flow path 102*a*-4. This achieves miniaturization of the flowmeter, and obtains constant flow rate measurement results.

In other words, it is arranged such that the joint portion itself of the manifold 9 and the flowmeter serve as a straitening portion, which allows the contradictory functions of miniaturization and straitening to be coexisted. Moreover, the flowmeter can be directly connected to the manifold 9, which eliminates the necessity of the joining portion for joining the flowmeter to an external flow path. In particular, a dimension in the lateral direction (in the direction parallel to the flow direction) can be made smaller than hitherto. Accordingly, this realizes miniaturization and lightening thereof in this respect as well. In addition, the flow path can be formed only by a process including injection molding of resin, and requires neither special processing nor connection joint or the like, which achieves the easily manufactured and inexpensive flowmeter.

Additionally, in the First Embodiment, the bent portions 102*a*, 103*a* are provided to obtain the straitening effect of the fluids instead of providing in the flow path a means such as a filter.

For this reason, even when the fluids contain foreign matters, the foreign matters are held back in the bent portions 102*a*, 103*a* (the corners thereof), and do not block the flow path itself. Therefore, the occurrence of a phenomenon can be prevented in which the foreign matters are piled up on the filter and block the flow path, undergoing a change in characteristics as in the case of using a means such as a filter. This maintains stable characteristics thereof even in a long-term service.

Alternatively, in the above First Embodiment, while the sensor flow path 101 straight along the flow direction is adopted, the sensor flow path 101 may be formed such that the sectional area of the flow path at which the sensor 4 is positioned is reduced. Such an example will be described hereinafter.

Figure 5:
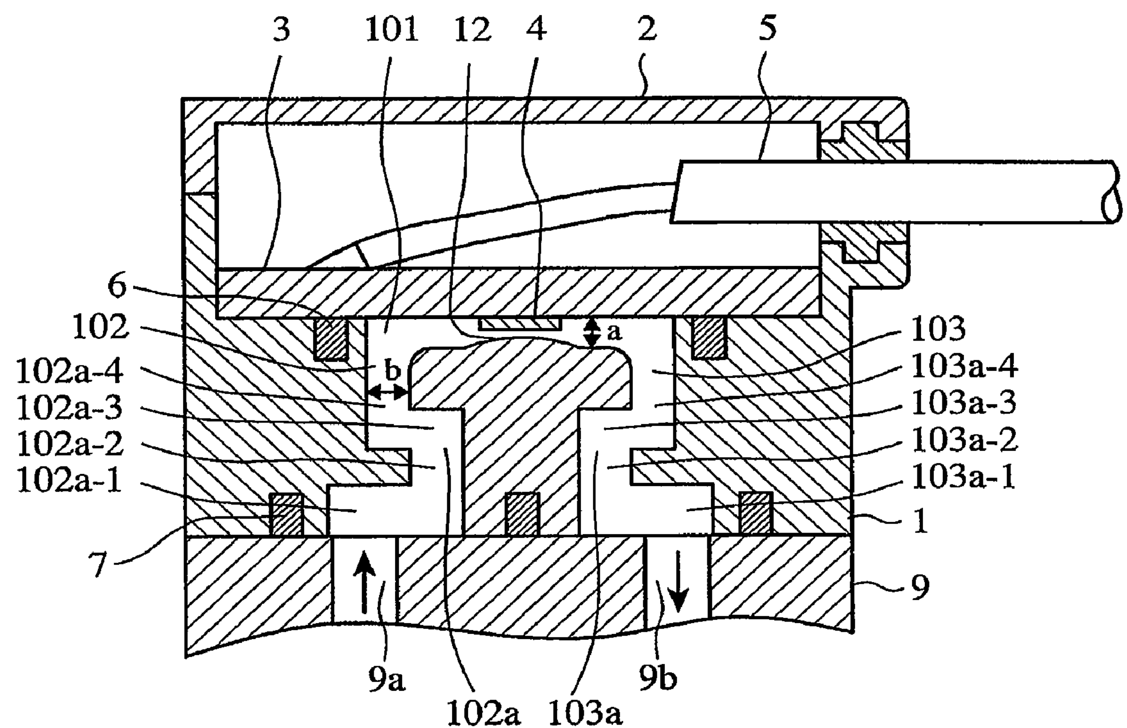
FIG. 5 is a sectional view of another example of a flowmeter according to the First Embodiment of the present invention.
Figure 6:
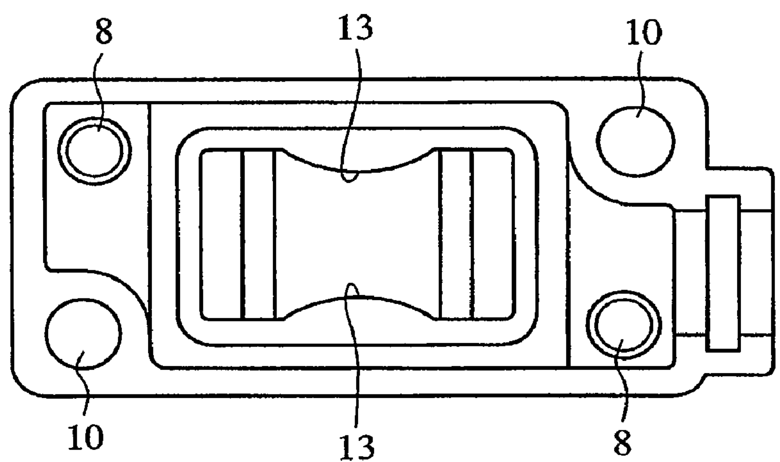
FIG. 6 is a top plan view of the other example of a flowmeter body according to the First Embodiment of the present invention.

FIG. 5 and FIG. 6 are a sectional view of the flowmeter body and a view thereof seen from the top surface thereof, in the case where the flow path where the sensor 4 is positioned is narrowed down.

As shown in FIG. 5, an arcuate surface 12 projecting into the flow path is provided on the bottom wall of the sensor flow path 101 at which the sensor 4 is positioned. Further, as shown in FIG. 6, an arcuate surface 13 projecting into the flow path is provided on each side wall of the sensor flow path 101 at which the sensor 4 is positioned.

Such arrangement causes the fluids guided to the sensor flow path 101 to be subjected to further straining at the flow path narrowed down into the shape designated by the arcuate surfaces 12, 13, thus ensuring a measurement of the flow rate by the sensor 4 under more stable conditions.

Additionally, in the example shown in FIG. 5 and FIG. 6, whereas both of the arcuate surface 12 and the arcuate surfaces 13 are formed, even when either of these arcuate surfaces is formed, the straitening effect thereof can be expected despite of the decreased straitening.

Figure 7:
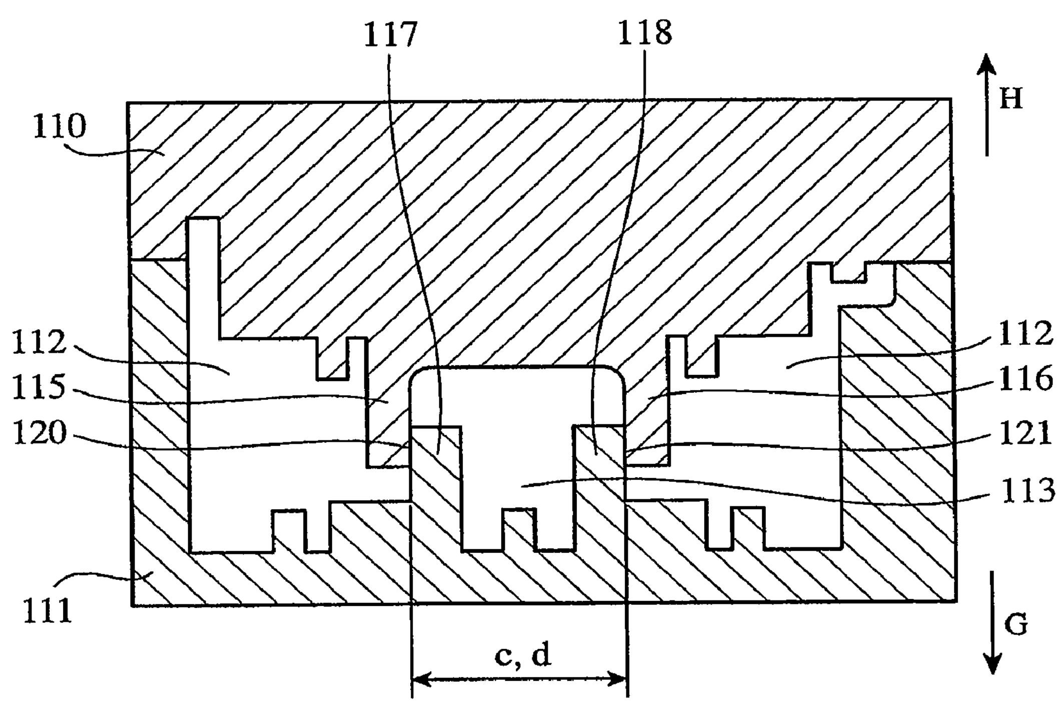
FIG. 7 is a sectional view of metal molds used in making a flowmeter according to the First Embodiment of the present invention.

An example in which the flowmeter body 1 is formed by the use of two metal molds will be given. Sectional views of a first metal mold 110 and a second metal mold 111 are shown in FIG. 7. As shown in FIG. 7, the hollowed out surfaces of the first metal mold 110 and the second metal mold 111 are face to facely disposed. Then, the first and second metal molds 110, 111 form a first cavity 112 and a second cavity 113. The first and second cavities 112, 113 look as if they are separated from each other in the sectional view shown in FIG. 7; however, the first and second cavities 112, 113 are actually communicated with each other in the ends thereof. Resin is injected thereinto through a resin-injection hole (not shown) formed in either of the metal molds, and after the resin hardened, the first metal mold 110 is moved in the direction of H and the second metal mold 111 is moved in the direction of G. This produces the flowmeter body 1, made of the resin mirroring the cavities 112, 113, as shown in FIG. 4(*b*).

At that time, when a first-fourth projections 115-118 are formed such that they are parallel to each other and moreover, the distance between the opposite internal faces of the first projection 115 and the second projection 116 within the first metal mold 110 is nearly equal to the distance between the external faces of the third projection 117 and the fourth projection 118 within the second metal mold 111, the first projection 115 and the third projection 117, and the second projection 116 and the fourth projection 118 come in contact with each other on the contact surfaces 120, 121, respectively. This, in the flowmeter body 1 made of resin, provides communication between the first hole formed by the first projection 115 and the third hole formed by the third projection 117, and further, provides communication between the second hole formed by the second projection 116 and the fourth hole formed by the fourth projection 118. After injection molding, the flow path having the bent portions can be formed easily by simply fitting the circuit board 3 to the top surface of the flowmeter body 1.

The maximum width c of a virtually T-shaped member 131 located at the center of the flowmeter body 1, shown in FIG. 1, and the opposite width d between the projections 132 located on the side members forming the side of the flowmeter body 1 are arranged to be equal to each other. That is, when the first-fourth holes are formed virtually parallel to each other, and the minimum distance between the ends of the first and the second holes and the maximum distance between the ends of the third and the fourth holes are arranged to have substantially the same dimension, the bend portion can be simply formed as mentioned above, thereby omitting the other processes for providing communication between the first-fourth holes.

Further, a curved surface portion 130 is provided on the corners of the virtually T-shaped member 131 located at the center of the flowmeter body 1. In other words, the provision of the curved surface portion 130 on the tube wall of the intersection of the first and second holes and the straight sensor flow path 101 formed on the top surface of the flowmeter body 1 allows a turbulent flow to be changed to a flow suitable for measuring a flow rate by means of a shorter straight portion, as compared with the case where the curved surface portion 130 is not provided, thus producing the more compact flowmeter.

In addition, in the First Embodiment, while the example is given in which the flow direction of the fluids of the manifold 9 is perpendicular to that of the sensor flow path 101, the invention is not naturally limited thereto. Instead, even when the manifold 9 is provided in the different direction such as for example a direction oblique relative to the flowmeter, a similar effect can be obtained.

Moreover, in the above First Embodiment, the example is given in which the flowmeter verifies whether or not the absorption is occurred in the chip mounter. While the application of the flowmeter to such a purpose takes a greater effect; however, the present invention is not undoubtedly limited to such a mode of utilization. The flowmeter is also able to detect unintermitted changes of the flow rate (flow velocity) of the fluids, for example. Additionally, the fluids are not of course limited to air. The flowmeter is of application to a variety of fluids as long as the fluids are gas.

Further, in the above First Embodiment, the upstream flow path 102 and the downstream flow path 103 are symmetrically disposed with respect to the sensor 4. Hence, the flowmeter can equally measure a flow rate of fluids flowing thereinto through the outlet port 9*b* of the manifold 9 and flowing out to the inlet port 9*a*, for example.

Still further, in the above First Embodiment, while the description is made on the assumption that the manifold 9 positioned in the lower portion for convenience of consistency with the drawings, the present invention is not naturally limited to such a positional relation. The flow meter is allowed to have any vertical and lateral positional relation in installing the flowmeter.

Still further, in the above First Embodiment, whereas the example is given in which the flow path inlet of fluids of the flowmeter body abuts with the manifold 9, the invention is not of course limited thereto. The flowmeter may have any structure as long as the structure feeds fluids to the flowmeter.

Yet further, in the First Embodiment, while the bent portions 102*a*, 103*a* are formed to include the abutted surfaces with the inlet port 9*a* and the outlet port 9*b*, respectively, these bent portions may be formed anywhere as long as these bent portions are formed within the upstream flow path 102 and the downstream flow path 103.

INDUSTRIAL APPLICABILITY

As mentioned hereinabove, the flowmeter according to the present invention is good for a small flowmeter used for purposes such as verifying whether or not an absorption of micro elements are occurred in the chip mounter.

The invention claimed is:

1. A flowmeter comprising:

a sensor flow path at which a sensor detecting a flow rate of fluids is positioned; and an upstream flow path situated upstream of the sensor flow path, wherein the upstream flow path is bent, an open end of the upstream flow path is abutted against an inlet port of a manifold for feeding the fluids thereto, and the upstream flow path has a bent portion between an abutted surface of the inlet port and the sensor flow path; said flowmeter further comprising:

a flowmeter body; and a circuit board holding the sensor; wherein the upstream flow path passes through a first bore formed between the open end of the upstream flow path and a first interior location of the flowmeter body and a second bore formed between the sensor flow path of the flowmeter body and the first interior location of the flowmeter body, a downstream flow path passes through a third bore formed between the sensor flow path and a second interior location of the flowmeter body and a fourth bore formed between an open end of the downstream flow path abutted against an outlet port of a manifold for exhausting the fluids therefrom and the second interior location of the flowmeter body, the sensor flow path passes from the second bore, through a space between the circuit board and the flowmeter body, to the third bore, and the bent portion is provided by forming the first to fourth bores virtually parallel to each other setting a minimum distance between volumes of the second and the third bores less than a maximum distance between volumes of the first and the fourth bores, thereby bringing the volume of the first bore into communication with the volume of the second bore and bringing the volume of the third bore into communication with the volume of the fourth bore.

2. A flowmeter comprising:

a sensor flow path at which a sensor detecting a flow rate of fluids is positioned; and an upstream flow path situated upstream of the sensor flow path, wherein the upstream flow path is bent, an open end of the upstream flow path is abutted against an inlet port of a manifold for feeding the fluids thereto, and the upstream flow path has a bent portion between an abutted surface of the inlet port and the sensor flow path; said flowmeter further comprising:

a flowmeter body; and a circuit board holding the sensor; wherein the upstream flow path passes through a first bore formed between the open end of the upstream flow path and a first interior location of the flowmeter body and second bore formed between the sensor flow path of the flowmeter body and the first interior location of the flowmeter body, a downstream flow path passes through a third bore formed between the sensor flow path and a second interior location of the flowmeter body and a fourth bore formed between an open end of the downstream flow path abutted against an outlet port of a manifold for exhausting the fluids therefrom and the second interior location of the flowmeter body, the sensor flow path passes from the second bore, through a space between the circuit board and the flowmeter body, to the third bore, and the bent portion is provided by forming the first to fourth bores virtually parallel to each other setting a minimum distance between volumes of the second and the third bores less than a maximum distance between volumes of the first and the fourth bores, thereby bringing the volume of the first bore into communication with the volume of the second bore and bringing the volume of the third bore into communication with the volume of the fourth bore;

wherein a curved surface portion is provided on a flow path wall of intersections of the second and third bores and the straight sensor flow path.

* * * * *